(12) United States Patent
Fujii et al.

(10) Patent No.: US 6,402,873 B1
(45) Date of Patent: Jun. 11, 2002

(54) METHOD OF MANUFACTURING LAMINATED THERMOPLASTIC RESIN SHEET AND APPARATUS THEREFOR

(75) Inventors: Atsushi Fujii; Akira Funaki; Masahiro Kubo, all of Sodegaura (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/167,715

(22) Filed: Oct. 7, 1998

(30) Foreign Application Priority Data

Oct. 8, 1997 (JP) .............................. 9-275801

(51) Int. Cl.[7] ...................... B29C 47/06; B29C 47/34; B29C 47/88; B32B 31/20; B32B 31/30
(52) U.S. Cl. ............................. 156/244.11; 156/244.24; 156/244.27; 156/498; 156/501; 156/555; 156/580
(58) Field of Search ................. 156/244.11, 244.24, 156/244.27, 498, 500, 501, 543, 555

(56) References Cited

U.S. PATENT DOCUMENTS

| | | | | |
|---|---|---|---|---|
| 2,607,712 A | * | 8/1952 | Sturken | 156/501 |
| 2,690,206 A | * | 9/1954 | Mueller | 156/501 |
| 3,017,302 A | * | 1/1962 | Hultkrans | 156/244.11 |
| 3,470,055 A | * | 9/1969 | Wade | 156/500 |
| 3,669,794 A | * | 6/1972 | Mazur | 156/322 |
| 4,076,895 A | * | 2/1978 | Theno | 156/244.11 |
| 4,973,375 A | * | 11/1990 | Nishida et al. | 156/244.11 |
| 5,707,478 A | * | 1/1998 | Fujii et al. | 156/324 |
| 5,833,792 A | * | 11/1998 | Funaki et al. | 156/324 |

FOREIGN PATENT DOCUMENTS

| | | | | |
|---|---|---|---|---|
| EP | 803340 | * | 10/1997 | |
| JP | 62-142624 | * | 6/1987 | 156/244.27 |
| JP | 9-136346 | * | 5/1997 | |

* cited by examiner

*Primary Examiner*—Steven D. Maki
(74) *Attorney, Agent, or Firm*—Oblon, Spivak, McClelland, Maier & Neustadt, P.C.

(57) ABSTRACT

A method of manufacturing a laminated thermoplastic resin sheet having an improved transparency without generating a wrinkle and an apparatus therefor are provided. The laminated thermoplastic resin sheet is manufactured by using an apparatus including an endless belt wound between a first cooling roll having an elastic material, a second cooling roll and a third cooling roll brought into contact with the first cooling roll through the belt, arranging a guide roll near the first roll so as to introduce a molten thermoplastic resin sheet between the first and third cooling rolls in such a manner as to be brought into contact with the belt and the third cooling roll substantially at the same time, and introducing a thermoplastic resin film between the belt and the third cooling roll via the guide roll.

9 Claims, 1 Drawing Sheet

METHOD OF MANUFACTURING LAMINATED THERMOPLASTIC RESIN SHEET AND APPARATUS THEREFOR

BACKGROUND OF THE INVENTION

1. Field of the Invention

The present invention relates to a method of manufacturing a thermoplastic resin sheet having a laminated structure and an apparatus therefor, and an obtained sheet can be used for packaging food products, medical and pharmaceutical products and the like.

2. Description of the Related Art

A laminated thermoplastic resin sheet, obtained by laminating a function film which applies an easy slipping characteristic, an oxygen barrier characteristic and the like to a base material sheet made of a polypropylene or the like, is used in a field of food products and the like.

The easily slipping film includes a nonoriented polypropylene film and the like, and the oxygen barrier film includes an EVOH film and the like.

Conventionally, such a laminated thermoplastic resin sheet is manufactured by a coextrusion method, a dry laminate method or the like.

However, in the case of the coextrusion method, since an adhesive layer having a certain thickness or more is required between the base material sheet and the function film, the adhesive layer prevents a transparency. Further, it is hard to manufacture a multiple layer sheet made of resins having different melting characteristics with increasing transparency. Still further, since a rate of an edge portion of the sheet to be trimmed is relatively large, a cost loss is increased in the case that the function film is expensive such as the EVOH film.

On the contrary, in the case of the dry laminate method, since the sheet and the film are bonded to each other through an adhesive, an amount of the adhesive is increased, so that cost is increased, when the thickness of the sheet becomes thick due to an increase in the number of the layers. Since a solvent is contained in the adhesive, a countermeasure for the environment is necessary.

SUMMARY OF THE INVENTION

Accordingly, an object of the present invention is to provide a method of manufacturing a laminated thermoplastic resin sheet having an improved transparency without generating a wrinkles and an apparatus therefor.

In accordance with a first aspect of the present invention, there is provided a method of manufacturing a laminated thermoplastic resin sheet, which uses a manufacturing apparatus comprising a first cooling roll having a surface coated by an elastic material, a second roll, a metal endless belt wound between the first roll and the second roll and a third cooling roll, brought into contact with the first cooling roll through the metal endless belt, comprising the steps of arranging a guide roll for introducing a film near the first or third roll so as to introduce a thermoplastic resin sheet in a melting state between the first and third cooling rolls in such a manner as to be brought into contact with the metal endless belt supported by the first cooling roll and the third cooling roll substantially at the same time, introducing a thermoplastic resin film between the metal endless belt and the third cooling roll through the guide roll so as to laminate the sheet and the film, pressing and cooling the laminated thermoplastic resin sheet in a plane manner by the first and third rolls while elastically deforming the elastic material by a pressing force between the first and third rolls, and continuously pressing and cooling the laminated thermoplastic resin sheet to the third cooling roll in a plane manner by the endless belt.

In accordance with the present invention, it is preferable that the metal endless belt and the rolls are formed in a mirror surface having a surface roughness 0.5 S or less.

A stainless steel, a carbon steel, a titanium alloy and the like can be used for a material of the metal endless belt. A thickness of the endless belt can be optionally selected, however, from the view point of the belt strength, e.g. 0.3 mm or more is preferable.

In this case, it is sufficient that at least the first cooling roll and the second roll are situated at the inside of the endless belt, and the other tolls for adjusting a tension and for cooling in an auxiliary manner may be included.

A fluorine rubber, a silicone rubber, an EPDM, an NBR and the like can be used for the elastic material. Further, it is preferable to set a thickness of the elastic material to be 3 mm or more for obtaining an improved plane pressure by an elastic deformation.

The thermoplastic resin sheet in the melting state corresponds to, for example, a thermoplastic resin sheet immediately after being extruded from a T die of an extruding machine.

The thermoplastic resin sheet becomes a base material sheet, and a material thereof can be optionally selected among a polyethylene, a polypropylene, a polystyrene, a nylon and the like.

The thermoplastic resin film corresponds to, for example, a formed film fed out from a film supply roll. The thermoplastic resin film corresponds to a function film applying functions such as an easy slipping characteristic, an oxygen barrier characteristic and the like to the base material sheet. For example, in the case of the easily slipping film, a non oriented polypropylene film or the like is employed, and in the case of the oxygen barrier film, an EVOH film is employed.

The thermoplastic film may have a multiple layer structure, for example, a two layer structure comprising EVOH layer/PP layer, and a three layer structure comprising PP layer/EVOH layer/PP layer.

A thickness of the thermoplastic resin film can be optionally selected,.however, 10 to 1000 $\mu$m is preferable. Cooling means may be provided in the first to third rolls.

In the present invention, since the thermoplastic resin sheet and film are relatively different from each other only in view of a thickness, any of them may be called as the sheet or the film.

In accordance with the present invention, the sheet and the film are pressed and laminated in a plane manner together with an elastic deformation of the elastic material, a bonding strength between the laminated sheets is improved, and a rate of shrinkage at a time of laminating can be controlled within a certain small range.

Further, at a time of laminating the sheet and the film, since the guide roll for introducing the film is arranged near the first or third roll, the film is brought into a little contact with the endless belt or the third roll, so that the thermoplastic resin film can be prevented from generating a wrinkle as much as possible.

In accordance with a second aspect of the present invention, there is provided a method of manufacturing a laminated thermoplastic resin sheet as recited in the first aspect, wherein the guide roll for introducing the film is arranged at a position at which an angle formed by a line between both centers of the first and third rolls and a contact point of the thermoplastic resin film with the endless belt or the third roll is 45 degrees or less.

When the contact portion between the thermoplastic resin film and the endless belt or the third roll is increased, a generation of the wrinkle is increased at the degree, so that the angle is set to be 45 degrees or less in order to prevent wrinkling this as much as possible. The angle is preferably 30 degrees or less.

The object to be contacted is set to the endless belt or the third roll for the reason of corresponding to the case that the thermoplastic resin film is laminated on one surface (a front surface) or another surface (a back surface) of the thermoplastic resin sheet.

Here, in the present invention, a definition is made by the angle formed by a line between both centers of the first and third rolls and the contact point of the thermoplastic resin film with the endless belt or the third roll, however, a definition may be made by an introducing angle of the thermoplastic resin film to a nip portion (between the first and third cooling rolls) with respect to the line between both centers of the first and third rolls, and it is preferable as the angle is near 90 degrees.

In accordance with a third aspect of the present invention, there is provided a method of manufacturing a laminated thermoplastic resin sheet as stated in the first or second aspect, wherein a back tension 9.8 N/m to 294.0 N/m is applied to the thermoplastic resin film.

The back tension can be applied by adjusting a speed of a supply device for the thermoplastic resin film.

In the case that the back tension is less than 9.8 N/m, an effect of sufficiently preventing a generation of a wrinkle and an effect of improving a stability in manufacturing can not be obtained. Further, when it is more than 294.0 N/m, there is a risk that the thermoplastic resin film extends so that a width of the film is narrowed.

In accordance with a fourth aspect of the present invention, there is provided a method of manufacturing a laminated thermoplastic resin sheet as stated in any one of the first to third inventions, wherein the thermoplastic resin film is laminated on either the one surface or another surface of the molten thermoplastic resin sheet through the guide roll for introducing the film.

That is, in accordance with the present invention, there can be obtained a laminated thermoplastic resin sheet structured to have at least three layers in which thermoplastic resin films are respectively laminated on an upper layer and a lower layer of the thermoplastic resin sheet as an intermediate layer.

In accordance with a fifth aspect of the present invention, there is provided an apparatus for manufacturing a laminated thermoplastic resin sheet, comprising a first cooling roll having a surface coated by an elastic material, a second roll, a metal endless belt wound between the first roll and the second roll, a third cooling roll brought into contact with the first cooling roll through the metal endless belt, molten resin supplying means arranged so as to introduce a thermoplastic resin sheet in a melting state between the first and third cooling rolls in such a manner as to be brought into contact with the metal endless belt contact with the first cooling roll and the third cooling roll substantially at the same time, and a guide roll for introducing the film arranged near the first or third roll so as to introduce a thermoplastic resin film between the metal endless belt and the third cooling roll.

The present invention corresponds to an apparatus for realizing the first method discussed above.

In accordance with a sixth aspect of the present invention, there is provided an apparatus for manufacturing a laminated thermoplastic resin sheet as recited in the fifth aspect, wherein the guide roll for introducing the film is arranged at a position at which an angle formed by a line between both centers of the first and third rolls and a contact point of the thermoplastic resin film with the endless belt or the third roll is 45 degrees or less.

The present invention corresponds to an apparatus for realizing the second method discussed above.

In accordance with a seventh aspect of the present invention, there is provided an apparatus for manufacturing a laminated thermoplastic resin sheet as recited in the fifth or sixth aspect, wherein the guide roll for introducing the film is arranged in either one surface or another surface of the molten thermoplastic resin sheet.

The present invention corresponds to an apparatus for realizing the fourth method discussed above.

DESCRIPTION OF THE PREFERRED EMBODIMENTS

First Embodiments

Figure 1:
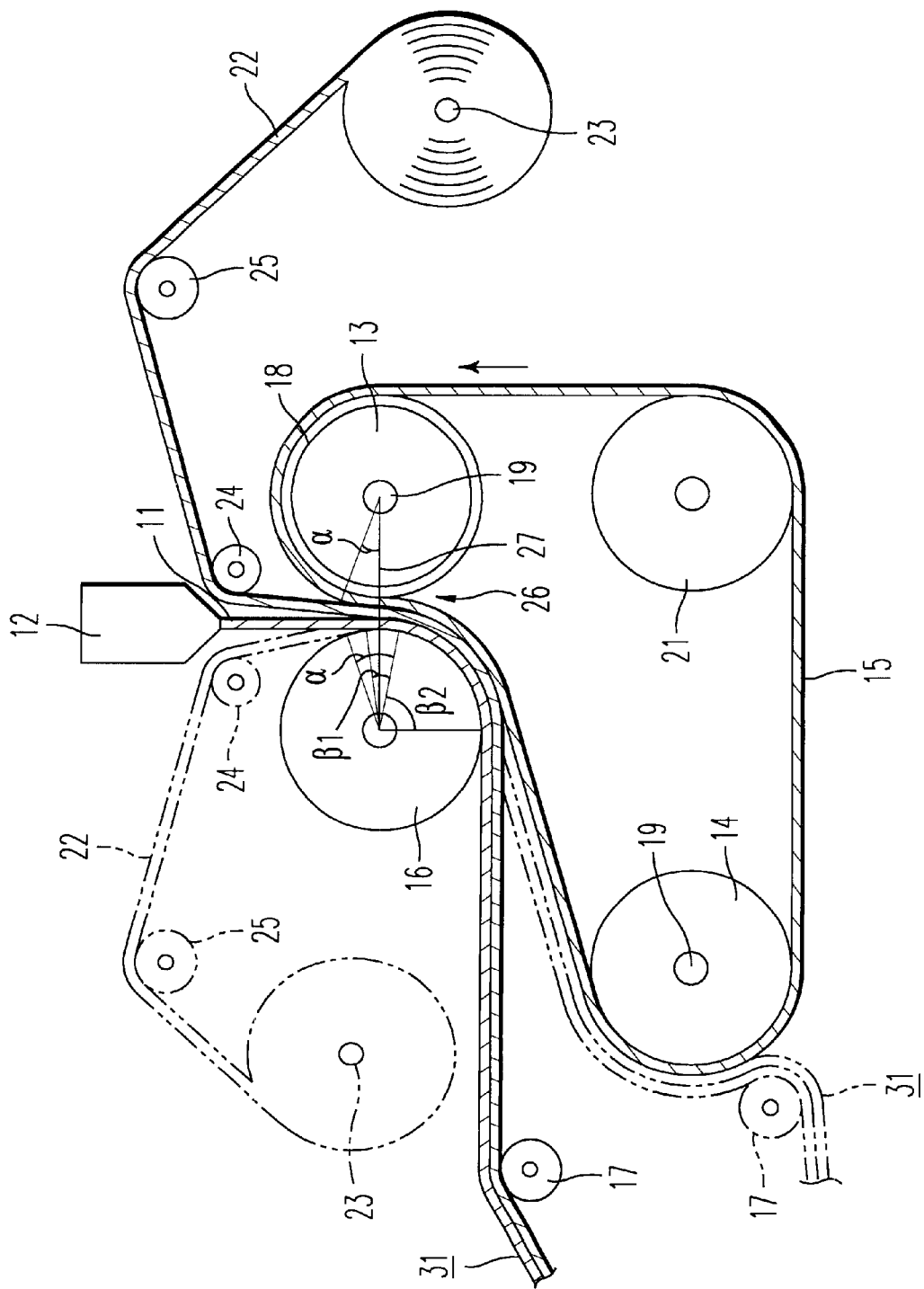
FIG. 1 is a schematic view of a manufacturing apparatus used in a method of manufacturing a laminated thermoplastic resin sheet in accordance with an embodiment of the present invention.

At first, a structure of a manufacturing apparatus used in a method of manufacturing a laminated thermoplastic resin sheet 31 having a two layer structure in accordance with this embodiment will be described below with reference to FIG. 1.

The manufacturing apparatus is constituted by a T die 12 of an extruding machine for supplying a thermoplastic resin sheet 11, a metal endless belt 15 wound between a first cooling roll 13 and a second cooling roll 14, a third cooling roll 16 brought into engagement with the first roll 13 through the metal endless belt 15, and a film supply roll 23 for supplying a formed thermoplastic resin film 22. Further, a fourth roll 21 for adjusting a tension and cooling in an auxiliary manner is provided within a path inside the endless belt 15.

The first roll 13 is structured such that an elastic member 18 such as a fluorine rubber or the like is coated on an outer peripheral surface thereof. The elastic material 18 is structured such that a hardness (on the basis of JIS K6301 A type) thereof is 95 degrees or less, and a thickness thereof is 3 mm or more.

The metal endless belt 15 is made of stainless steel or the like, and is provided with a mirror surface having a surface roughness 0.5 S or less.

At least one of the first and second rolls 13 and 14 is structured such that a rotating shaft 19 thereof is connected to rotation drive means (not shown).

The third roll 16 is a metal roll and is provided with a mirror surface having a surface roughness 0.5 S or less.

The third roll 16 is arranged at a position at which the metal endless belt 15 is held in a part of a peripheral surface thereof. That is, the metal endless belt 15 moves in a zigzag direction so as to wind around a part of the outer peripheral surface of the third roll 16.

Then, first guide roll 24 and second guide roll 25 for introducing the thermoplastic resin film are arranged between the film supply roll 23 and a nip portion 26 (between the first cooling roll 13 and the third cooling roll 16) so as to introduce the thermoplastic resin film 22 between the endless metal belt 15 and the third cooling roll 16. As shown in FIG. 1, one first guide roll 24 is arranged between the extruder 12 and the first cooling roll 13 and a second first guide roll 24 (shown in phantom lines) is arranged between the extruder 12 and the third cooling roll 16.

The first guide roll 24 is arranged near the first roll 13. A distance between the first guide roll 24 and the nip portion 26 is preferably set to be 500 mm or less so as to prevent a wrinkle from generating. The guide roll 24 has a slight curve, and is an expander roll capable of removing a wrinkle.

Particularly, the first guide roll 24 is arranged at a position at which an angle a formed by a line 27 between both centers of the first and third rolls 13 and 16 and a contact point of the thermoplastic resin film 22 with the endless belt 15 is 45 degrees or less.

Further, a back tension 9.8 N/m to 294.0 N/m is applied to the thermoplastic resin film 22 by controlling a rotation of the film supply roll 23.

The second guide roll 25 is provided at a suitable position in the side of the film supply roll 23.

Temperature adjusting means (not shown) of a water cooling type or the like capable of adjusting a temperature of the surface is provided in each of the rolls 13, 14, 16 and 21.

Next, a manufacturing method in accordance with this embodiment using the manufacturing apparatus will be described below.

As soon as the molten thermoplastic resin sheet 11 extruded out from the T die 12 of the extruding machine is introduced to the nip portion 26 between the first and third rolls 13 and 16, the thermoplastic resin film 22 extruded out from the film supply roll 23 is introduced to the nip portion 26 through the first guide roll 24, so that the sheet 11 and the film 22 are laminated and cooled at the same time.

At this time, the elastic material 18 elastically deforms in such a manner as to be compressed by a pressing force between the first and third rolls 13 and 16, and the sheet 11 and the film 22 is in a plane pressure contact state by both roll 13 and 16 at a portion having an angle θ1 from a center of both rolls 13 and 16 at which the elastic member 18 is elastically deformed.

Continuously, the laminated thermoplastic resin sheet 31 is pressed to the third roll 16 by the endless belt 15 and cooled. The laminated thermoplastic resin sheet 31 pressed to the roll 16 by the endless belt 15 is held to the roll 16 at a holding angle θ2 from a center of the roll 16, and the laminated thermoplastic resin sheet 31 is pressed in a plane manner at the portion having the holding angle θ2 by the endless belt 15 and the third roll 16.

Next, the laminated thermoplastic resin sheet 31 is removed from the endless belt 15, and taken up to a take-up roll (not shown) partially around a third guide roll 17.

In this caste, the structure may be made such that the third guide roll 17 is provided near the second roll 14, the laminated thermoplastic resin sheet 31 closely attached to the endless belt 15 is moved to the second roll 14 in accordance with a rotation of the endless belt 15, and a further cooling is performed by the second roll 14.

In accordance with this embodiment, at the portion having the angle θ1 of the first and third rolls 13 and 16, since the sheet 11 and the film 22 are pressed in a plane pressure manner and cooled at the same time when the sheet 11 and the film 22 are laminated by the rolls 13 and 16 and the endless belt 15 while elastically deforming the elastic member 18, a bonding strength of the laminated thermoplastic resin sheet 31 is improved.

Then, since the thermoplastic resin film 22 is introduced to the nip portion 26 through the first guide roll 24 at a time of laminating the sheet 11 and the film 22, a contact portion of the thermoplastic resin film 22 with the endless belt 15 is reduced, and a generation of a wrinkle in the thermoplastic resin film 22 can be prevented, so that the laminated thermoplastic resin sheet 31 without a wrinkle can be obtained.

Second Embodiments

In the first embodiment, the structure is made such that the thermoplastic resin film 22 is laminated on one surface of the thermoplastic resin sheet 11. As shown by two dot chain lines in FIG. 1, in accordance with this embodiment, the structure is made such that the film supply roll 23 for supplying another thermoplastic resin film 22 and first and second guide rolls 24 and 25 for introducing the thermoplastic resin film 22 are further provided on the back of the thermoplastic resin sheet 11, so that the thermoplastic resin film 22 can be laminated on both surfaces of the thermoplastic resin sheet 11.

Also in this case, the first guide roll 24 for introducing the other thermoplastic resin film 22 is arranged at a position at which the angle a formed by the line 27 between both centers of the first and third rolls 13 and 16 and the contact point of the thermoplastic resin film 22 with the third roll 16 is 45 degrees or less.

EXAMPLES

Example 1

In the first embodiment mentioned above, a laminated thermoplastic resin sheet 31 is manufactured by setting particular conditions of a manufacturing apparatus and a manufacturing method as follows:

Diameter of first to fourth rolls . . . 400 mm;

Elastic member of first roll . . . silicone rubber, thickness: 10 mm, hardness: 40 degrees;

Surface temperature of first roll . . . 20° C.;

Surface temperature of second roll . . . 20° C.;

Surface temperature of third roll . . . 20° C.;

Angle α . . . 10 degrees;

Metal endless belt . . . thickness: 0.8 mm, speed: 25 m/min;

Thermoplastic resin sheet . . . polypropylene sheet [IDEMITSU POLYPRO F-205S produced by IDEMITSU Petrochemical Co., Ltd];

Thermoplastic resin film . . . three layer structure of polypropylene (30 μm)/EVOH (30 μm)/polypropylene (30 μm);

Tension of thermoplastic resin film . . . 50.0 N/m; and

Laminated thermoplastic resin sheet . . . thickness; 0.3 mm, width: 1200 m.

Example 2

From example 1, only the angle α and the tension of the thermoplastic resin film 22 are changed as follows:

Angle α . . . 20 degrees; and

Tension of thermoplastic resin film . . . 30.0 N/m,

Example 3

From example 1, only the angle α and the tension of the thermoplastic resin film 22 are changed as follows.

Angle α . . . 30 degrees; and
Tension of thermoplastic resin film . . . 50.0 N/m.

Example 4

From example 1, only the angle α and the tension of the thermoplastic resin film 22 are changed as follows.

Angle α . . . 40 degrees; and
Tension of thermoplastic resin film . . . 50.0 N/m.

Comparative Examples 1 to 3

In the case of a comparative example 1, the first guide roll 24 for introducing the film 22 is not provided in the apparatus in accordance with example 1, and the angle α is 60 degrees.

In the case of a comparative example 2, in example 1, only the tension of the thermoplastic resin film 22 is changed to 400.0 N/m.

In the case of a comparative example 3, the laminated thermoplastic resin sheet 31 is the same as in example 1 and is manufactured in accordance with a coextrusion method. A preferred adhesive is Admer QB550 (trade name).

Estimation of Characteristics

With respect to the laminated thermoplastic resin sheet 31 obtained in the four examples and the three comparative examples mentioned above, whether or not a wrinkle is generated is checked, and also a haze and a gloss are measured. The results thereof are shown in Table 1.

The haze and gloss are measured in accordance with JIS K 7105.

TABLE 1

| | Angle α | Tension (N/m) | Speed (m/min) | Haze (%) [total/inner portion] | Gloss | Wrinkle |
|---|---|---|---|---|---|---|
| Example 1 | 10 | 50.0 | 25 | 2.0/1.3 | 140 | No |
| Example 2 | 20 | 30.0 | 25 | 1.7/1.2 | 140 | No |
| Example 3 | 30 | 50.0 | 25 | 1.9/1.3 | 140 | No |
| Example 4 | 40 | 50.0 | 25 | 2.1/1.2 | 140 | No |
| Comparative example 1 | 60 | 50.0 | 25 | 1.9/1.4 | — | Yes |
| Comparative example 2 | 20 | 400 | 25 | 1.8/1.3 | 140 | No |
| Comparative example 3 | — | — | 25 | 6.3/5.7 | 135 | — |

As shown in Table 1, in accordance with examples 1 to 4, since the thermoplastic resin film 22 is introduced to the nip portion 26 through the first guide roll 24 for introducing the film 22 at a time laminating together the thermoplastic resin sheet 11 and the thermoplastic resin film 22, the laminated thermoplastic resin sheet 31 having a good haze and gloss can be obtained.

Further, the generation of a wrinkle does not happen in the obtained laminated thermoplastic resin sheet 31.

On the contrary, in accordance with the comparative example 1, since the first guide roll 24 for introducing the film 22 is not provided, a contact length of the thermoplastic resin film 22 with the endless belt 15 is too long so that a wrinkle is generated in the laminated thermoplastic resin sheet 31.

In accordance with the comparative example 2, although the first guide roll 24 or introducing the film 22 is provided, the back tension is too large, so that the thermoplastic resin film 22 is extended so as to make it hard to control a width thereof.

In accordance with the comparative example 3, since the laminated thermoplastic resin sheet 31 is manufactured by a coextrusion method, the obtained laminated thermoplastic resin sheet 31 has a high haze and is deteriorated in transparency.

In accordance with the method of manufacturing the laminated thermoplastic resin sheet 31 and the apparatus of the present invention, the laminated thermoplastic resin sheet 31 having an improved transparency can be manufactured without generating a wrinkle.

What is claimed is:

1. A method of manufacturing a laminated thermoplastic resin sheet, which uses a manufacturing apparatus comprising an extruder, a first cooling roll having a surface coated by an elastic material, a second cooling roll spaced from the first cooling roll, a metal endless belt wound between the first roll and the second roll, and a third cooling roll spaced from the second cooling roll but brought into engagement with the first cooling roll through said metal endless belt, comprising the steps of:

arranging a first guide roll at a position between the extruder and said first or third cooling roll;

extruding a thermoplastic resin sheet in a molten state from the extruder and introducing the extruded thermoplastic resin sheet between the first and third cooling rolls in such a manner as to be brought into engagement with said metal endless belt and said third cooling roll substantially at the same time;

applying a back tension from 9.8 N/m to 294.0 N/m to a thermoplastic resin film;

introducing the thermoplastic resin film between said metal endless belt and said third cooling roll via said first guide roll so as to laminate the sheet and the film;

pressing and cooling continuously said laminated thermoplastic resin sheet in a plane manner by said first and third rolls while elastically deforming said elastic material by a pressing force applied between said first and third rolls;

pressing and cooling continuously said laminated thermoplastic resin sheet to the third cooling roll in a plane manner by said endless belt;

removing said laminated thermoplastic resin sheet from the metal endless belt; and taking up said laminated thermoplastic resin sheet partially around a third guide roll.

2. A method of manufacturing a laminated thermoplastic resin sheet as recited in claim 1, further comprising the step of:

arranging said first guide roll at a position so that an angle formed by a first line between both centers of the first and third cooling rolls and a second line between the center of the respective roll and an initial contact point of said thermoplastic resin film with said endless belt or the third cooling roll is 45 degrees or less.

3. A method of manufacturing a laminated thermoplastic resin sheet as recited in claim 1, further comprising the step of:

laminating another thermoplastic resin film on another surface of said molten thermoplastic resin sheet via a second guide roll.

4. A method of manufacturing a laminated thermoplastic resin sheet as recited in claim 1, further comprising the steps of:

adjusting the back tension to the thermoplastic resin film by adjusting a speed of a supply device for supplying the thermoplastic resin film; and cooling the metal endless belt in a manner auxiliary to the first, second and third cooling rolls via a fourth cooling roll provided inside a path of the metal endless belt but spaced from the first, second and third cooling rolls.

5. An apparatus for manufacturing a laminated thermoplastic resin sheet, comprising:

a first cooling roll having a surface coated by an elastic material;

a second cooling roll spaced from the first cooling roll;

a metal endless belt wound between the first roll and the second roll;

a third cooling roll spaced from the second cooling roll but brought into engagement with the first cooling roll through said metal endless belt;

molten resin supplying device arranged so as to introduce a thermoplastic resin sheet in a molten state between the first and third cooling rolls in such a manner as to be brought into engagement with said metal endless belt and said third cooling roll substantially at the same time;

a device configured to apply a back tension from 9.8 N/m to 294.0 N/m to a thermoplastic resin film;

a first guide roll configured to introduce the thermoplastic resin film, said first guide roll being arranged between the molten resin supplying device and said first or third cooling roll so as to introduce the thermoplastic resin film between said metal endless belt and said third cooling roll whereby the thermoplastic resin sheet and the thermoplastic resin film are laminated by the metal endless belt and the third cooling roll; and a third guide roll provided near the second cooling roll and configured to remove the laminated thermoplastic resin sheet from the metal endless belt by taking up the laminated thermoplastic resin sheet partially therearound.

6. An apparatus for manufacturing a laminated thermoplastic resin sheet as recited in claim 5, wherein said first guide roll is arranged at a position so that an angle formed by a first line between both centers of the first and third cooling rolls and a second line between the center of the respective roll and an initial contact point of said thermoplastic resin film with said endless belt or the third cooling roll is 45 degrees or less.

7. An apparatus for manufacturing a laminated thermoplastic resin sheet as recited in claim 5, further comprising:

a second guide roll configured to introduce another thermoplastic resin film so that said another thermoplastic resin film can be laminated on another surface of said molten thermoplastic resin sheet.

8. An apparatus for manufacturing a laminated thermoplastic resin sheet as recited in claim 5, further comprising:

a fourth cooling roll configured to adjust tension of the metal endless belt and to cool said belt in a manner auxiliary to the first, second and third cooling rolls, said fourth cooling roll being provided inside a path of the endless belt and also being spaced from the first, second and third cooling rolls.

9. An apparatus for manufacturing a laminated thermoplastic resin sheet, according to claim 5, further comprising:

a film supply device for the thermoplastic resin film to which the back tension can be applied by adjusting a speed of the film supply device.

* * * * *

UNITED STATES PATENT AND TRADEMARK OFFICE
CERTIFICATE OF CORRECTION

PATENT NO. : 6,402,873 B1  Page 1 of 1
DATED : June 11, 2002
INVENTOR(S) : Fujii et al.

It is certified that error appears in the above-identified patent and that said Letters Patent is hereby corrected as shown below:

<u>Title page,</u>
The Continued Prosecution Application information has been omitted. It should read as follows:
-- [45]  Date of Patent:    *Jun. 11, 2002
  [*]   Notice: This patent issued on a continued prosecution application filed under 37 CFR 1.53(d), and is subject to the twenty year patent term provisions of 35 U.S.C. 154(a )(2).

Subject to any disclaimer, the term of this patent is extended or adjusted under 35 U.S.C. 154(b) by 0 days. --

Signed and Sealed this

Seventeenth Day of December, 2002

JAMES E. ROGAN
*Director of the United States Patent and Trademark Office*